US009139291B2

(12) United States Patent  (10) Patent No.: US 9,139,291 B2
Himmelmann  (45) Date of Patent: Sep. 22, 2015

(54) INTEGRATED HYDROSTATIC TRANSMISSION FOR ELECTRONIC TAXIING OPERATIONS

(71) Applicant: HAMILTON SUNDSTRAND CORPORATION, Windsor Locks, CT (US)

(72) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 162 days.

(21) Appl. No.: 13/903,509

(22) Filed: May 28, 2013

(65) Prior Publication Data

US 2014/0353423 A1  Dec. 4, 2014

(51) Int. Cl.
*B64C 25/50* (2006.01)
*B64C 25/40* (2006.01)

(52) U.S. Cl.
CPC ............. *B64C 25/405* (2013.01); *Y02T 50/823* (2013.01)

(58) Field of Classification Search
USPC ..................................... 244/50, 100 R, 103 R
See application file for complete search history.

(56) References Cited

U.S. PATENT DOCUMENTS

| 2,376,621 | A | * | 5/1945 | Reed | 244/103 S |
| 3,542,318 | A | * | 11/1970 | Ellsworth | 244/103 S |
| 3,850,389 | A | * | 11/1974 | Dixon | 244/103 S |
| 8,684,300 | B2 | * | 4/2014 | Wilson et al. | 244/50 |
| 2012/0138734 | A1 | | 6/2012 | Hissong | |
| 2012/0217340 | A1 | * | 8/2012 | Essinger et al. | 244/50 |
| 2013/0200210 | A1 | * | 8/2013 | Oswald et al. | 244/50 |
| 2014/0246539 | A1 | * | 9/2014 | Didey | 244/50 |

FOREIGN PATENT DOCUMENTS

EP   2236419 A2   10/2010
EP   2548802 A2   1/2013

OTHER PUBLICATIONS

European Patent Office extended Search Report; Application No/ Patent No. 14169147.7-1754; Date of Mailng: Oct. 6, 2014; pp. 1-6.

* cited by examiner

*Primary Examiner* — Christopher P Ellis
(74) *Attorney, Agent, or Firm* — Cantor Colburn LLP

(57) ABSTRACT

A system, method and apparatus for propelling an object across a surface is disclosed. A motor is disposed at a location of a wheel of the object and draws electrical power directly from a power supply in order to generate a constant mechanical motion such as a constant rotation. A transmission receives the constant mechanical motion from the motor and generates a variable mechanical motion such as a variable-speed rotation at a wheel. Rotation of the wheel propels the object across the surface.

20 Claims, 2 Drawing Sheets

INTEGRATED HYDROSTATIC TRANSMISSION FOR ELECTRONIC TAXIING OPERATIONS

BACKGROUND

The present invention relates to ground propulsion for an aircraft and, more specifically, to a method and apparatus for taxiing an aircraft.

Aircraft generally taxi along a runway using propulsion provided from the aircraft engines. However, using the aircraft engines for the purpose of taxiing expends large amounts of fuel. In addition, particles from the ground can easily be swept into the engines during taxiing and cause damage to the engine.

SUMMARY

According to one embodiment of the present invention, an apparatus for ground propulsion of an object includes: a motor disposed at a location of a wheel of the object configured to draw electrical power directly from a power supply and generate a constant mechanical motion; and a transmission configured to receive the constant mechanical motion and generate a variable mechanical motion at the wheel to propel the object.

According to another embodiment of the present invention, a ground propulsion system for an aircraft includes: a wheel; a motor coupled configured to receive electrical power received directly from a power supply and generate a constant mechanical motion; and a transmission configured to receive the constant mechanical motion and generate a variable mechanical motion at the wheel to propel the aircraft.

According to another embodiment of the present invention, a method of propelling an object across a surface includes: generating a constant rotation at a motor disposed at a wheel of the object; receiving the constant rotation at a transmission to generate a variable rotation; and transferring the variable rotation from the transmission to a wheel to propel the object across the surface.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
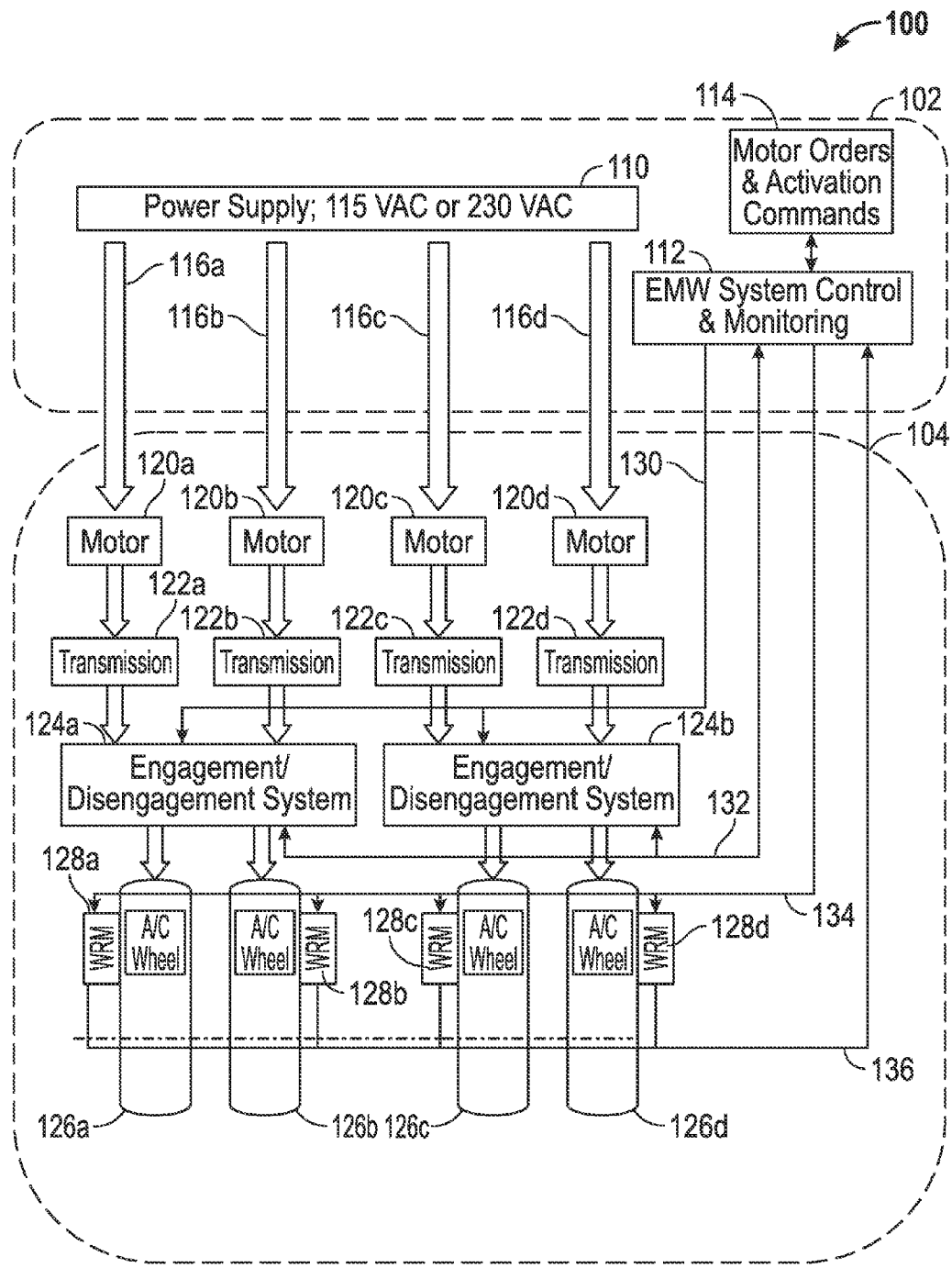
FIG. 1 shows a schematic diagram of a system for providing ground propulsion of an object.

FIG. 1 shows a schematic diagram of a system 100 for providing ground propulsion of an object. In an exemplary embodiment, the object may be an aircraft and ground propulsion of the aircraft may refer to a taxiing operation of the aircraft across a runway. The exemplary system 100 includes various aircraft body components 102 that are disposed within a body of the aircraft and various components of a wheel assembly 104 that are disposed at a wheel location extended from the body of the aircraft. The aircraft body components 102 may include for example, a power supply 110, such as an aircraft electrical bus. In various embodiments, power supply 110 may provide alternating current at about 400 Hertz and about 115 volts (115 V AC) or 230 V AC. Power from the power supply 110 is supplied to components of the wheel assembly 104 over power lines 116a, 116b, 116c and 116d. In addition, the aircraft body components 102 may include a control and monitoring system 112 that controls and monitors various operations that occur at the wheel assembly 104. The control and monitoring system 112 may receive various orders and activation commands from a command unit 114. In addition, the control and monitoring system 112 may provide various measurements to the command unit 114. The command unit 114 may include a processor or a manual system operated, for example, by a pilot of the aircraft.

The wheel assembly 104 may include one or more motors 120a, 120b, 120c and 120d, one or more transmissions 122a, 122b, 122c and 122d, one or more engagement/disengagement systems 124a and 124b and one or more wheels 126a, 126b, 126c and 126d. Each wheel 126a-d may be coupled to a corresponding motor 120a-d and transmission 122a-d. Motors 120a-d receive electrical power from the power supply 110 over transmission lines 116a-d, respectively. In various embodiments, at least one of the motors 120a-d may be a motor that may be connected directly to the power supply 110 and that generates a constant mechanical rotation of its rotor when energized by the power supply 110. The motors 120a-d may include at least one line start motor in an exemplary embodiment. Transmissions 122a-d receive the constant mechanical motion generated at their respective motors 120a-d and convert the received constant mechanical motion to a variable mechanical motion that may be used to generate rotation of wheels 126a-d. Engagement/disengagement system 124a may be operated to form or disrupt a coupling of the transmissions 122a and 122b to wheels 126a and 126b, respectively. Wheels 126a and 126b may form a wheel pair disposed on a landing strut of the aircraft. Engagement/disengagement system 124b may be operated to form or disrupt a coupling of the transmissions 122c and 122d to wheels 126c and 126d, respectively. Wheels 126c and 126d may form another wheel pair disposed on a landing strut of the aircraft. The engagement/disengagement systems 124a and 124b may be powered over exemplary power line 130 and may be monitoring and controlled by the control and monitoring system 112 over exemplary command line 132. Additionally, wheels 126a-d may be coupled to wheel rotation measurement devices 128a-d which provide feedback on the wheel rotation to the control and monitoring system 112. The wheel rotation measurement devices 128a-d may be powered over exemplary power line 134 and monitored and controlled by the control and monitoring system 112 over exemplary command line 136. The control and monitoring system 112 may thus be used to control a transmissions 122a-d to rotate the wheels 126a-d at selected rotation rates.

Figure 2:
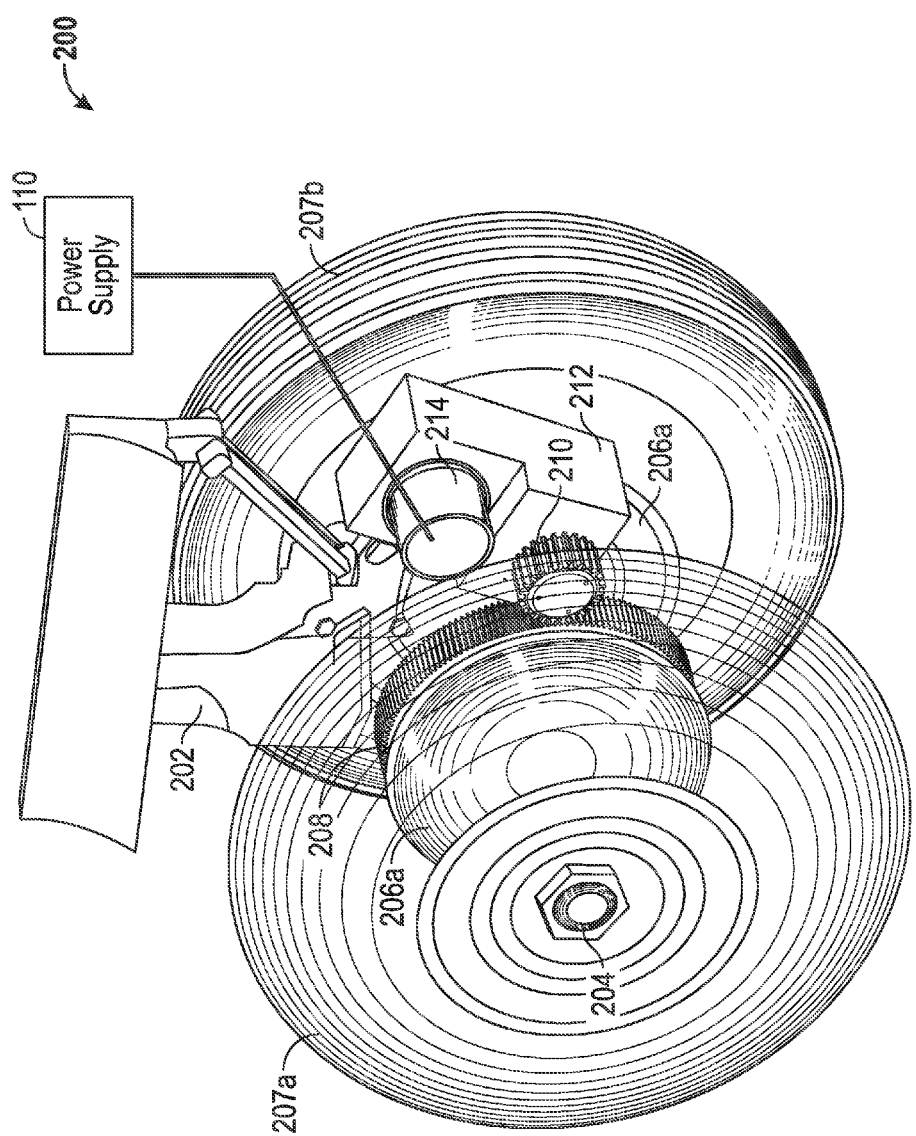
FIG. 2 shows an exemplary wheel assembly for propelling an aircraft along a ground or surface using the methods disclosed herein.

FIG. 2 shows an exemplary wheel assembly 200 for propelling an aircraft along a ground or surface using the methods disclosed herein. The wheel assembly 200 includes a landing strut 202 that extends from a body of an aircraft. The landing strut 202 is coupled to an axle 204 having at least one wheel 206a and 206b attached that rotates on the axle 204. In the illustration of FIG. 2, tire 207b is shown disposed on wheel 206*b* while tire 207*a*, which is disposed on wheel 206*a*, is shown as transparent in order to show details of the ground propulsion apparatus of the present invention. In an exemplary embodiment, the wheels 206*a* and 206*b* disposed on the axle 204 may rotate independently of each other. In the exemplary embodiment, the wheel 206*a* may be coupled to exemplary ring gear 208 that receives a mechanical force that generates a rotation of the wheel 206*a*. Similarly, wheel 206*b* may be coupled to a ring gear (not shown) to receive a mechanical force that generates a rotation of wheel 206*b*. Referring to wheel 206*a*, the ring gear 208 may be coupled to an output pinion 210 of a transmission 212 which may be a hydrostatic transmission. The output pinion 210 and the ring gear 208 may mesh together in order to form a coupling to transfer a rotation from the output pinion 210 to the ring gear 208*a* and to wheel 206*a*. In various embodiments, motor 214 is coupled to transmission 212 in order to generate a mechanical motion to activate the transmission 212. The motor 214 may be a constant velocity motor that may be coupled directly (i.e., without any intervening electronics) to the power supply of the aircraft such as power supply 110 via power line 216. The motor 214 may be a line start motor in an exemplary embodiment. Upon being energized by the power supply 110, the motor 214 produces a constant rotation of its rotor (not shown). The transmission 212 receives the constant rotation of the rotor and generates as output a variable rotation of output pinion 210 which generates rotation of wheel 206*a*. Similarly, a motor (not shown) and transmission (not shown) may be coupled to wheel 206*b* to generate rotation of wheel 206*b* for ground propulsion using the methods disclosed herein with respect to wheel 206*a*.

In known systems for ground propulsion, power from the power supply may be sent to an AC-to-DC converter which outputs a DC voltage. The DC voltage is input to an inverter and thus converted from DC voltage to a variable AC voltage. The variable voltage output by the inverter is provided to the motor and generates a variable speed at the motor. The additional electronics (i.e., the AC/DC converter and inverter) of the known systems of ground propulsion, add weight and complexity.

In one embodiment of the present invention, the motor 214 is directly coupled to the power supply 110 and generates a constant speed when energized and thus does not utilize the intervening AC-to-DC converter and inverter. While the motor 214 is directly coupled to the power supply 110, the system may include contactors or switches to disconnect the motor 214 from the power supply 110 or may include a filter that prevents the motor 214 from disturbing power quality at the power supply 110. The motor may be disposed at the wheel location and integrated with the transmission at the wheel location. The transmission may be a hydrostatic transmission that may convert the constant-speed rotation of the motor to a variable-speed rotation that may be provided to the wheel for ground propulsion. The hydrostatic transmission may also include one or more gears stages in order to reduce the size of the hydrostatic transmission component. In various embodiments, the integrated motor and transmission may be assembled to the wheel assembly 200 and/or landing strut 202 during manufacture of the wheel assembly 200. In alternate embodiments, the integrated motor and transmission may be attached to a pre-existing strut in order to retrofit an aircraft.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An apparatus for ground propulsion of an aircraft, comprising:
   an aircraft electrical bus providing alternating current;
   a motor disposed at a location of a wheel of the aircraft and connected to the aircraft electrical bus via a power line, wherein the motor draws electrical power directly from the aircraft electrical bus and generates a constant mechanical motion; and
   a transmission that receives the constant mechanical motion from the motor and generates a variable mechanical motion at the wheel to propel the aircraft.

2. The apparatus of claim 1 wherein the aircraft electrical bus is an auxiliary power supply located within a body of the aircraft.

3. The apparatus of claim 2, wherein the motor is further disposed at a location extended from a body of the aircraft.

4. The apparatus of claim 1, further comprising a control and monitoring system configured to control the transmission to generate the variable mechanical motion at the wheel at a selected rotation rate.

5. The apparatus of claim 1, wherein the transmission further comprises a hydrostatic transmission.

6. The apparatus of claim 1, wherein the motor is integrated with the transmission.

7. The apparatus of claim 1, wherein the motor is a line start motor.

8. A ground propulsion system for an aircraft, comprising:
   a wheel;
   an aircraft electrical bus providing alternating current;
   a motor coupled to the aircraft electrical bus via a power line and configured to receive electrical power directly from the aircraft electrical bus and generate a constant mechanical motion; and
   a transmission configured to receive the constant mechanical motion from the motor and generate a variable mechanical motion at the wheel to propel the aircraft.

9. The system of claim 8 wherein the aircraft electrical bus is an auxiliary power supply located within a body of the aircraft.

10. The system of claim 9, wherein the motor is disposed at a location extended from the body of the aircraft.

11. The system of claim 8, further comprising a control and monitoring system configured to control the transmission to generate the variable mechanical motion at the wheel at a selected rotation rate.

12. The system of claim 8, wherein the transmission further comprises a hydrostatic transmission.

13. The system of claim 8, wherein the motor is integrated into the transmission.

14. The system of claim 13, wherein the motor is a line start motor.

15. A method of propelling an aircraft across a surface, comprising:
provide an alternating current directly from an aircraft electrical bus to a motor disposed at a wheel of the aircraft;
generating a constant rotation at the motor using the alternating current;
receiving the constant rotation from the motor at a transmission to generate a variable rotation; and
transferring the variable rotation from the transmission to a wheel to propel the aircraft across the surface.

16. The method of claim 15, wherein the aircraft electrical bus further comprises an auxiliary power supply located within a body of the aircraft.

17. The method of claim 16, further comprising disposing the motor at a location extended from a body of the aircraft.

18. The method of claim 15, further comprising a control and monitoring system configured to control the transmission to generate the variable mechanical motion at the wheel at a selected rotation rate.

19. The method of claim 15, wherein the transmission further comprises a hydrostatic transmission.

20. The method of claim 15, wherein the motor is a line start motor.

* * * * *